United States Patent
Foo et al.

(10) Patent No.: US 11,178,055 B2
(45) Date of Patent: Nov. 16, 2021

(54) METHODS AND APPARATUS FOR PROVIDING DETERMINISTIC LATENCY FOR COMMUNICATIONS INTERFACES

(71) Applicant: Intel Corporation, Santa Clara, CA (US)

(72) Inventors: Kok Yoong Foo, Georgetown (MY); Choon Yee Tan, Butterworth (MY); Sze Yin Lee, Bukit Mertajam (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/442,367

(22) Filed: Jun. 14, 2019

(65) Prior Publication Data

US 2019/0306062 A1 Oct. 3, 2019

(51) Int. Cl.
*H04L 12/801* (2013.01)

(52) U.S. Cl.
CPC .................................. *H04L 47/12* (2013.01)

(58) Field of Classification Search
CPC ...................................................... H04L 47/12
See application file for complete search history.

(56) References Cited

U.S. PATENT DOCUMENTS

| 6,020,763 | A * | 2/2000 | Gabillard | G11C 8/10 326/108 |
| 6,570,945 | B1 * | 5/2003 | Ono | H04J 3/0632 370/509 |
| 6,816,504 | B1 | 11/2004 | Erickson | |
| 7,747,888 | B2 | 6/2010 | Frodsham et al. | |
| 8,078,791 | B1 | 12/2011 | Perla et al. | |
| 8,296,541 | B2 | 10/2012 | Gower et al. | |
| 8,806,093 | B2 | 8/2014 | Chacko et al. | |
| 9,118,566 | B1 * | 8/2015 | Mendel | H04L 43/0858 |
| 9,250,859 | B2 | 2/2016 | Mendel et al. | |
| 9,754,648 | B2 | 9/2017 | Mirichigni et al. | |
| 2002/0175712 | A1 * | 11/2002 | Kim | H03K 19/0963 326/98 |
| 2004/0213074 | A1 | 10/2004 | Johnson et al. | |
| 2005/0045367 | A1 * | 3/2005 | Somers | H01B 11/04 174/113 R |
| 2005/0114118 | A1 * | 5/2005 | Peck | G10L 25/87 704/208 |
| 2005/0286565 | A1 * | 12/2005 | Vakil | G06F 1/10 370/503 |
| 2007/0041405 | A1 | 2/2007 | Navada et al. | |

(Continued)

OTHER PUBLICATIONS

JESD204B Surivial Guide Analog Devices 2013/2014 (Year: 2014).*

*Primary Examiner* — Kevin M Cunningham

(57) ABSTRACT

A transmitter device may communicate with a receiver device via one or more data links. Data transmitted over the data links may be conveyed in accordance with a communications protocol that requires a deterministic latency for all data lanes in each of the data links. The receiver device may include a deterministic latency controller configured to store a worst-case latency value acquired upon initial startup and a predetermined link reinitialization latency compensation value. During normal operation, the deterministic latency controller may sum together the worst-case latency value and the predetermined link reinitialization latency compensation value to obtain a total compensated deterministic latency that is applied to all data links for simultaneous data release.

20 Claims, 6 Drawing Sheets

(56) References Cited

U.S. PATENT DOCUMENTS

| | | | |
|---|---|---|---|
| 2008/0141185 A1* | 6/2008 | Bushnell | G06F 1/3203 |
| | | | 716/108 |
| 2011/0235459 A1* | 9/2011 | Ware | G06F 3/0629 |
| | | | 365/233.11 |
| 2012/0030438 A1* | 2/2012 | Shafai | G06F 13/385 |
| | | | 711/159 |
| 2012/0047260 A1* | 2/2012 | Patel | H04L 49/9057 |
| | | | 709/225 |
| 2012/0151171 A1 | 6/2012 | Coteus et al. | |
| 2014/0013179 A1* | 1/2014 | Takaku | H04L 1/0045 |
| | | | 714/748 |
| 2014/0023048 A1* | 1/2014 | Vu | H04B 7/26 |
| | | | 370/336 |

* cited by examiner

METHODS AND APPARATUS FOR PROVIDING DETERMINISTIC LATENCY FOR COMMUNICATIONS INTERFACES

BACKGROUND

This relates generally to integrated circuits and more particularly, to the communications between multiple integrated circuits.

Integrated circuits are often coupled to one another via a high speed interface. One example of such high speed interface that has recently gained momentum is the JESD204 interface, which offers higher speeds, pin count reduction, and improved scalability over its predecessors. The JESD204 standard describes a multi-gigabit serial data link between a data converter and a corresponding receiver. One of the key requirements of the JESD204 standard (i.e., the newly revised JESD204B/C protocol) is the need to achieve deterministic latency that must be maintained over different operating temperatures and supply voltages, across different integrated circuit devices, and repeatable over multiple power cycles.

To meet this deterministic latency requirement, users of the integrated circuits need to manually read out and calculate the worst-case latency upon each system reinitialization since the worst case latency from one system reinitialization to another could vary by two or more cycles. Thus, each device could potentially require ten or more reinitializations to obtain an adequate sample size. This procedure must then be repeated across various process corners (i.e., slow-slow, typical-typical, and fast-fast process corners) to confirm the average number for the worst-case latency. Requiring the user to manually optimize the interface in this way may be unacceptably time-consuming and costly.

It is within this context that the embodiments described herein arise.

DETAILED DESCRIPTION

The present embodiments relate to a receiver circuit configured to receive data bits from a transmitter circuit via one or more data links. Upon a first system reinitialization, the receiver uses a built-in deterministic latency controller to detect and store the slowest data arrival latency (given a value X) across all links. The detected value X may be stored statically in a worst-case latency configuration status register (CSR). The stored value of X may be paired with a link reinitialization latency compensation amount Y, which represents an extra timing margin to help compensate for potential variation from one link reinitialization to another. Compensation amount Y may be stored statically in a latency offset configuration status register (CSR).

During normal communications operations, the latency controller may retrieve the value X from the worst-case latency CSR and the value Y from the latency offset CSR and compute a sum of X and Y to obtain a total release latency. The total release latency is then sent to an upper application layer so that the receiver buffer in each link can all be released by the application at the same time. Operated in this way, the deterministic latency target can be achieve for every reinitialization without requiring the user of the system to manually tabulate the worst-case latency count over multiple iterations, which helps save time and reduce cost.

It will be recognized by one skilled in the art, that the present exemplary embodiments may be practiced without some or all of these specific details. In other instances, well-known operations have not been described in detail in order not to unnecessarily obscure the present embodiments.

Figure 1:
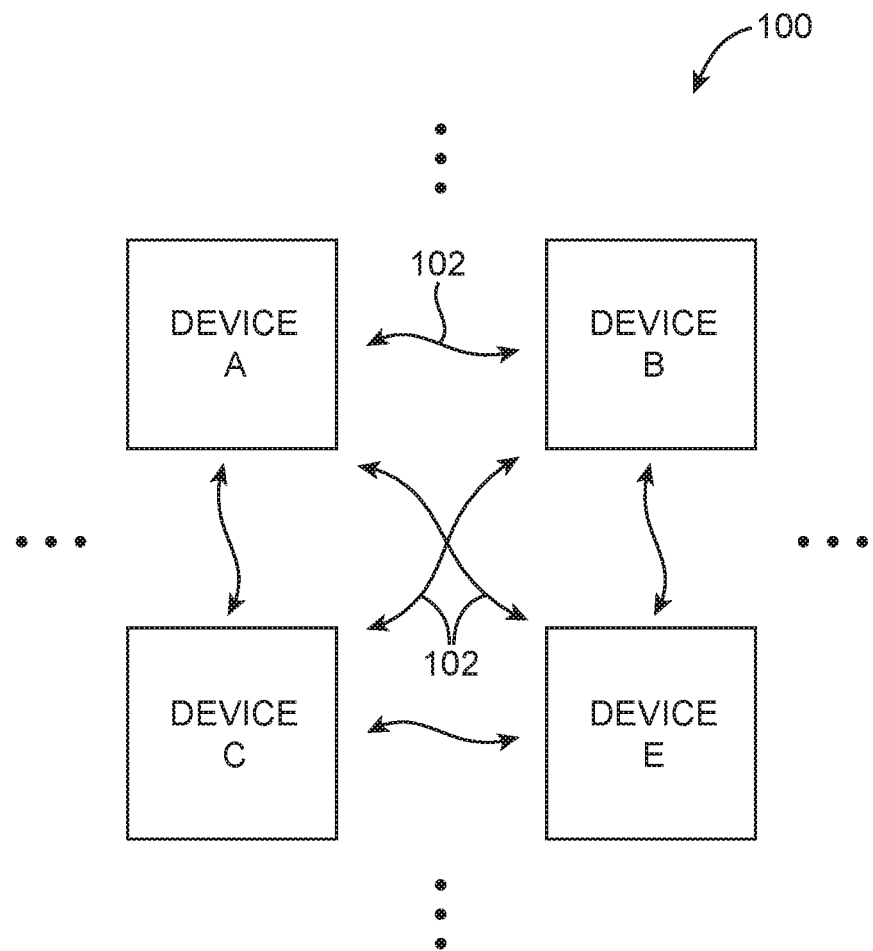
FIG. 1 is a diagram of an illustrative system of integrated circuit devices operable to communicate with one another in accordance with an embodiment.

FIG. 1 is a diagram of an illustrative system 100 of interconnected electronic devices. The system of interconnected electronic devices may have multiple electronic devices such as device A, device B, device C, device D, and interconnection resources 102.

Interconnection resources 102 such as conductive lines and busses, optical interconnect infrastructure, or wired and wireless networks with optional intermediate switching circuitry may be used to send signals from one electronic device to another electronic device or to broadcast information from one electronic device to multiple other electronic devices. For example, a transmitter in device B may transmit data signals to a receiver in device C. Similarly, device C may use a transmitter to transmit data to a receiver in device B.

The electronic devices may be any suitable type of electronic device that communicates with other electronic devices. Examples of such electronic devices include integrated circuits having electronic components and circuits such as analog circuits, digital circuits, mixed-signal circuits, circuits formed within a single package, circuits housed within different packages, circuits that are interconnected on a printed-circuit board (PCB), circuits mounted on different circuit boards, etc.

Figure 2:
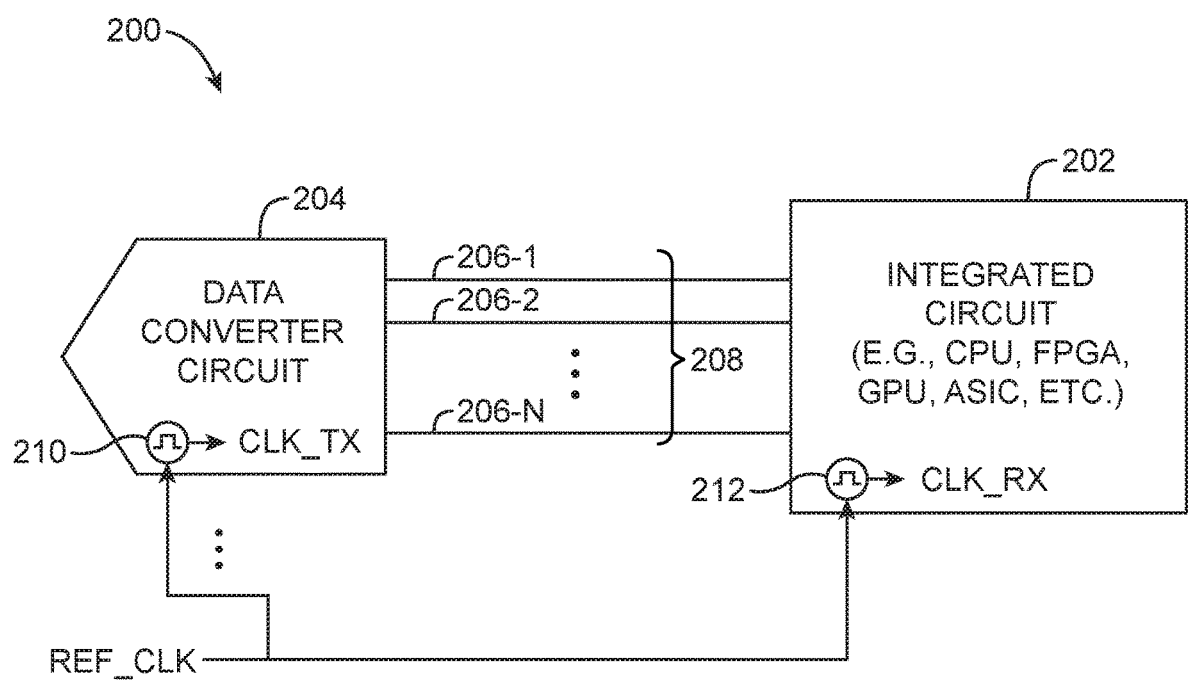
FIG. 2 is a diagram of an illustrative data link connecting a data converter circuit to a receiver integrated circuit in accordance with an embodiment.

FIG. 2 is a diagram of an illustrative system 200 that includes a transmitter such as transmitter circuit 204 coupled to a receiver such as integrated circuit (IC) 202 via a communications link 208 (sometimes referred to as a data link). In the example of FIG. 2, the transmitter may include a data converter circuit 204 (e.g., an analog-to-digital data converter) configured to output serial data bits to receiver integrated circuit 202 via data link 208. Receiver integrated circuit 202 may be a central processing unit (CPU), a programmable integrated circuit such as a field-programmable gate array (FPGA), a graphics processing unit (GPU), an application-specific integrated circuit (ASIC), an application-specific standard product (ASSP), a microcontroller, a microprocessor, or other suitable types of integrated circuits.

As shown in FIG. 2, data link 208 may include one or more data lanes. Data link 208 may, for example, have N data lanes 206-1, 206-2, . . . , and 206-N. The number of data lanes within a single communications link 208 may be at least one, more than one, one to ten, more than 10, 10-100, 100-1000, or may be equal to any suitable integer.

A system reference clock such as clock signal REF_CLK may be provided to both the transmitter and the receiver to help synchronous system 200. Transmitter 204 may include a clock generator circuit 210 that receives system reference clock REF_CLK and generates a corresponding local clock signal CLK_TX, whereas receiver 202 may include its own separate clock generator circuit 212 that receives system reference clock REF_CLK and generates a corresponding local clock signal CLK_RX. Since both the transmitter clock generator 210 and the receiver clock generator 212 receives REF_CLK from the same source, the local clock signals CLK_TX and CLK_RX should be generated at around the same time at the transmitter and receiver, respectively.

During normal communications, data may travel over the different data lanes 206 at slightly varying speeds (e.g., due to skew from board trace mismatch, receiver clock lock time mismatch, receiver word aligner phase difference, and other sources of deviations), which can result in mismatched latencies when arriving at the receiver. Certain interface protocols such as the JESD204B and JESD204C interface standards (as examples) require designation of a single deterministic latency across all data lanes and links (e.g., in a multi-link system) while maintaining desired link performance across different devices over different operating conditions and multiple power-up cycles.

Figure 3:
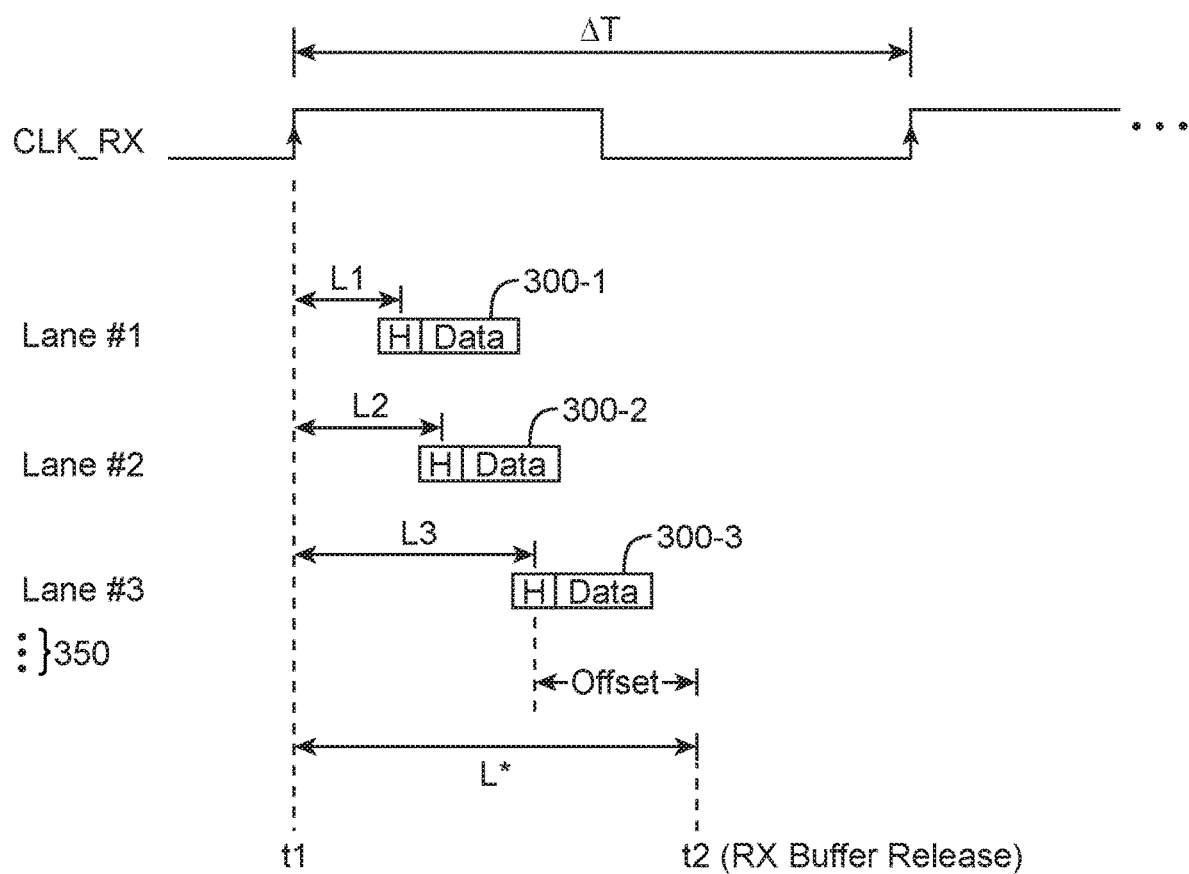
FIG. 3 is timing diagram illustrating how a detected worst-case latency may be combined with a link reinitialization compensation offset to obtain a golden reference release latency in accordance with an embodiment.

In accordance with an embodiment, a method is provided that can automatically detect the worst-case latency across multiples data lanes, which can then be extended to determine the worst-case latency across multiple data links in a multi-link system. FIG. 3 is timing diagram illustrating how a detected worst-case latency may be combined with a link reinitialization compensation offset to obtain a golden reference release latency in accordance with an embodiment. As shown in FIG. 3, data may be sent across a data link in response to detecting a first rising edge (at time t1) in the locally generated receiver clock signal CLK_RX. Clock signal CLK_RX may have a clock period ΔT.

In the example of FIG. 3, data be beginning traveling over the various data lanes starting at the first detected rising edge of signal CLK_RX at time t1. The data may be packaged into a unit sometimes referred to as a "multiblock" in the context of the JESD204C protocol. Each multiblock may include a header (H) for representing a boundary for the unit of data. The amount of latency for each multiblock may, for example, be measured from the local clock rising edge at time t1 to when the corresponding header is detected at the receiver. System configurations in which a multiblock represents a discrete unit of transferrable data may sometimes be described as an example herein. This is, however, merely illustrative. In general, information that is conveyed over a communications interface may be organized into any suitable form.

Referring to the example of FIG. 3, a first multiblock 300-1 may travel through a first data lane and arrive at the receiver circuit after a first detected latency amount L1. A second multiblock 300-2 may travel through a second data lane and arrive at the receiver after a second detected latency amount L2. A third multiblock 300-3 may travel through a third data lane and arrive at the receiver after a third detected latency amount L3. The data link may also include additional data lanes, as indicated by ellipses 350. In this particular example, latency L3 of the first data lane represents the greatest or maximum detected latency (i.e., L3 is greater than both L1 and L2 and presumably all of the other detected latency amounts associated with the remaining data lanes). As a result, latency L3 represents the worst-case latency value, sometimes also referred to as the latest latency amount or the slowest latency amount.

Selecting the worst-case detected latency value as the final deterministic latency would take into account all the mismatched skews among the various data lanes, but doing so may be insufficient since one or more cycles of latency variation can occur each time the data link is reinitialized. Thus, to compensate for this potential latency variation due to link reinitialization, a predetermined offset amount (sometimes referred to as the link reinitialization compensation value) may be added to the worst-case latency value to obtain the total deterministic latency value L*. The link reinitialization compensation value may be a predetermined number that provides a sufficient amount of margin that covers worst-case latency variations associated with link reinitialization events. Data in each of the data lanes may all be released simultaneously at time t2 (where the difference between t1 and t2 is equal to L*) from the respective receiver buffer circuits.

Latency amount L* may represent a golden reference deterministic latency that ensures proper link performance over all operating conditions across different receiver devices and is repeatable over multiple power-on cycles. The total computed latency amount L* obtained in this way may therefore sometimes be referred to as the golden reference latency, the final deterministic system latency, the buffer release latency, or the compensated latency.

Figure 4:
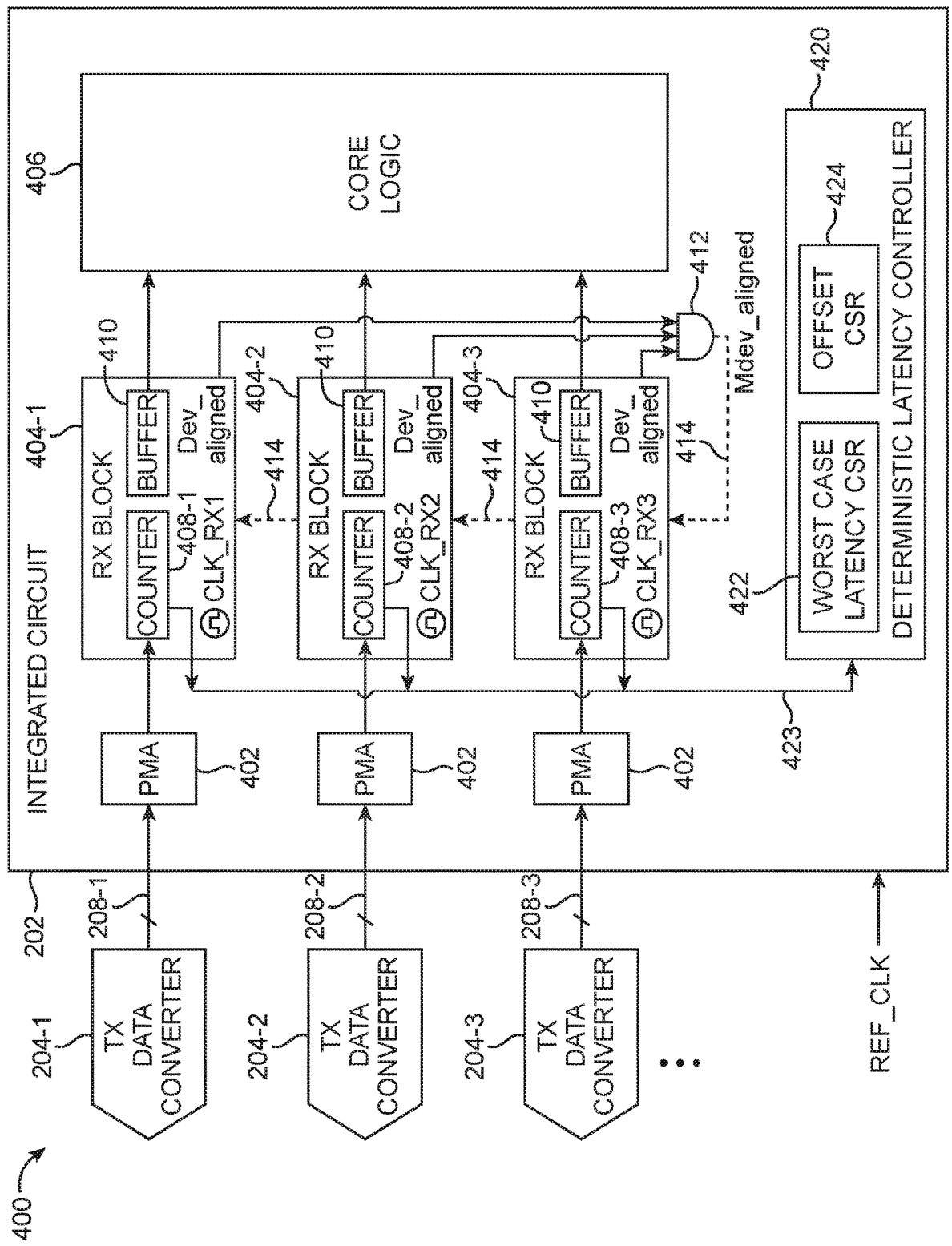
FIG. 4 is a diagram of an illustrative multi-link system where the receiver includes a deterministic latency controller configured to automatically compute the golden reference release latency in accordance with an embodiment.

The example of FIG. 4 in which L* is computed for a single data link is merely illustrative. In general, the total deterministic system latency may be determined across multiple data links. FIG. 4 is a diagram of an illustrative multi-link system 400 having multiple transmitter circuits configured to send signal to receiver circuit 202. As shown in FIG. 4, system 400 may include a first transmit data converter 204-1 operable to send data to receiver IC 202 via a first data link 208-1, a second transmit data converter 204-2 operable to send data to receiver IC 202 via a second data link 208-2, and a third transmit data converter 204-3 operable to send data to receiver IC 202 via a third data link 208-3. Although three transmitters are shown, system 400 may generally include any suitable number of transmitter circuits 204 for sending data to receiver 202.

Receiver 202 may include a first physical medium attachment (PMA) block 402 configured to receive data via the first data link 208-1, a second PMA block 402 configured to receive data via the second data link 208-2, a third PMA block 402 configured to receive data via the third data link 208-3, etc. PMA blocks 402, which may be configured to perform PMA framing, data synchronization, and/or data descrambling, may be part of a physical-layer interface component (oftentimes abbreviated as "PHY"). The PHY layer may further include physical medium dependent (PMD) sublayer blocks (e.g., transceiver blocks) and physical coding sublayer (PCS) blocks (e.g., a sublayer that determines when a functional link has been established and performs coding such as 64b/66b encoding). Functionally, the PMA block serves as an interface between the PMD block and the PCS block.

Receiver IC 202 may further include at least a first receiver (RX) block 404-1 configured to receive data from the first PMA block 402, a second RX block 404-2 configured to receive data from the second PMA block 402, and a third RX block 404-3 configured to receive data from the third PMA block 402. Generally, the number of RX blocks 404 in receiver 202 may be at least equal to or greater than the number of data links 208 supported by the receiver.

Each receiver block 404 may include a buffer circuit 410 for receiving and storing data arriving via the corresponding data link. Buffer circuit 410 may, for example, be an elastic buffer that temporarily buffers the incoming data and then releases the buffered data at some later point in time to core logic circuitry 406. The core logic circuitry 406 may include user logic circuits, embedded functional blocks, embedded memory blocks, arithmetic circuits, and other circuitry designed to perform the desired functions on IC 202.

Each receiver block 404 may be further configured to generate its own local clock signal based on the system reference clock signal REF_CLK. For example, first RX block 404-1 may use system reference clock REF_CLK to generate a corresponding local clock signal CLK_RX1; second RX block 404-2 may use system reference clock REF_CLK to generate a corresponding local clock signal CLK_RX2; and third RX block 404-3 may use system reference clock REF_CLK to generate a corresponding local clock signal CLK_RX3.

Each receiver block 404 may further include a counter circuit such as latency detection counter 408 that is triggered by the first rising edge of the locally generated clock signal (e.g., counter 408 may begin counting in response to detecting that CLK_RXi begins toggling). For example, latency counter 408-1 in the first RX block 404-1 will begin counting in response to detecting a first rising edge in signal CLK_RX1; latency counter 408-2 in the second RX block 404-2 will begin counting in response to detecting a first rising edge in signal CLK_RX2; and latency counter 408-2 in the third RX block 404-3 will begin counting in response to detecting a first rising edge in signal CLK_RX3.

In a multi-link implementation such as system 400 illustrative in FIG. 4, the final captured latency needs to be the slowest lane in the slowest link. To achieve this, each RX block 404 will assert an alignment signal dev_aligned upon receiving the header of the multiblock in the slowest data lane. Assuming there is skew among the different data links, each RX block 404 will assert signal dev_aligned at different times. All of the dev_aligned signals may then ANDed together using logic AND gate 412. Operated in this way, AND gate 412 may output an asserted signal Mdev_aligned, which is then fed to each RX block 404 via path 414. In response to receiving an asserted Mdev_aligned signal, the latency detection counter 408 in each of the RX blocks 404 will stop counting. This will ensure that the detected counter value stops incrementing across all links at the same time.

Still referring to FIG. 4, receiver 202 may further include a deterministic latency controller 420 that includes a worst-case latency configuration status register (CSR) 422 and an offset configuration status register (CSR) 424. The worst-case latency CSR 422 may be used to store the maximum counter value detected at the various latency counters 408 sensed via path 423. Thus, CSR 422 will statically store the worst-case detected latency value. Offset CSR 424, on the other hand, may be configured to statically store the link reinitialization latency compensation value to provide extra margin in the total deterministic golden reference latency amount.

This example in which the worst-case latency value and the link reinitialization latency compensation value are stored in configuration status registers is merely illustrative. The configuration status registers may be implemented using nonvolatile memory so that the stored values will persist from one power-on cycle to another. If desired, however, the worst-case latency value and the link reinitialization latency compensation value may be stored in any type of data register circuitry, non-volatile memory, volatile memory, etc.

The multi-link system implementation of FIG. 4 is merely illustrative. In a single data link implementation, logic AND gate 412 may be bypassed or omitted and counter 408 may stop counting as soon as the dev_aligned signal is asserted. The counter value output by counter 408 may then be stored in worst-case latency register 422 within the deterministic latency controller.

Figure 5:
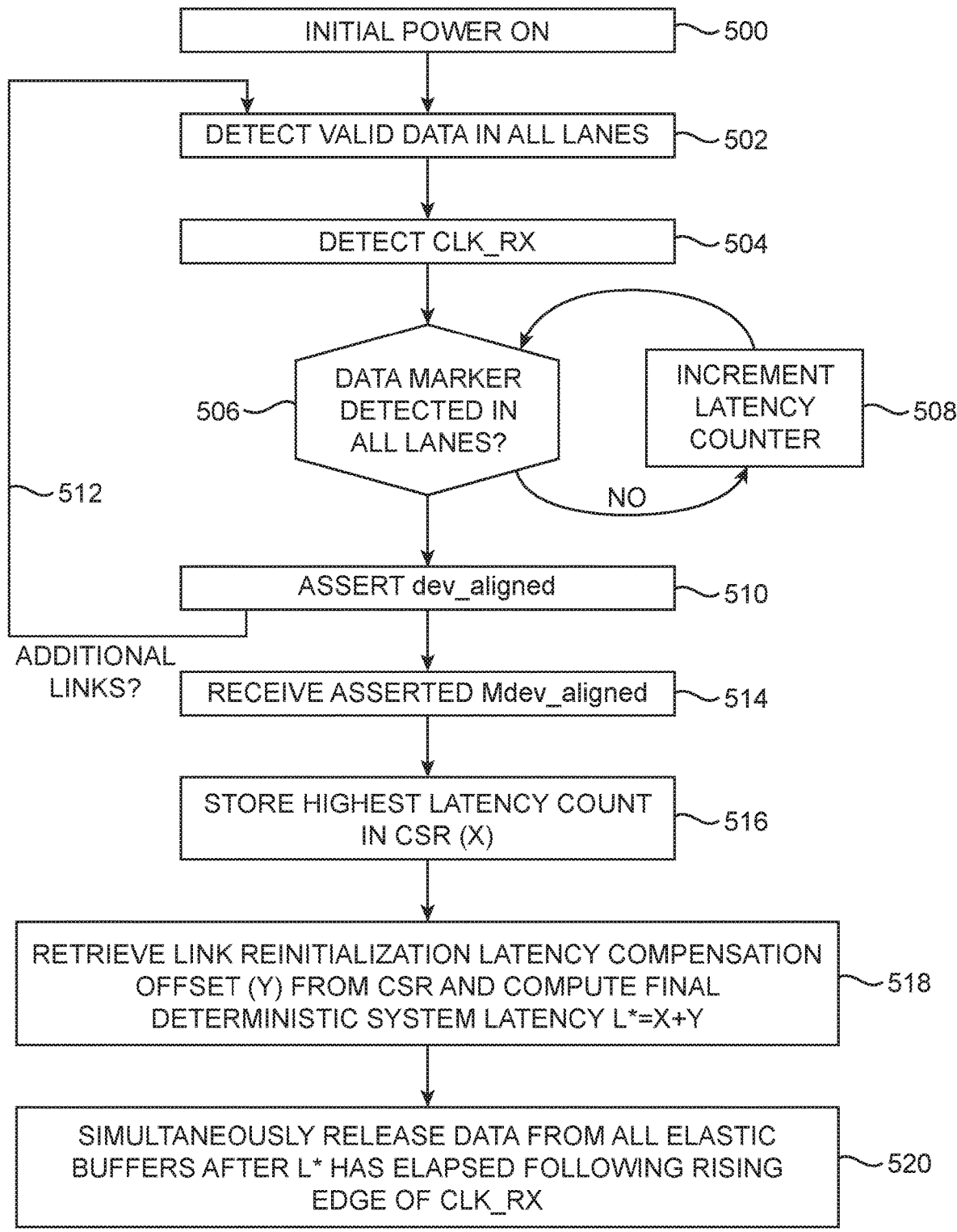
FIG. 5 is a flow chart of illustrative steps for computing a final deterministic system latency for a multi-link system of the type shown in FIG. 4 in accordance with an embodiment.

FIG. 5 is a flow chart summarizing illustrative steps for computing the final deterministic system latency L* for a multi-link system (see, e.g., multi-link system 400 of FIG. 4). At step 500, the receiver integrated circuit 202 may be powered on by a user or customer for the very first time. At step 502, valid data may begin arriving over the various data lanes of that link. Data arriving via the various lanes at the receiver block 404 will be held temporarily at the corresponding elastic buffer 410.

At step 504, a local clock signal begins to toggle (i.e., a first rising edge of CLK_RX is detected). In other words, an RX block 404 for a particular data link may determine whether its locally generated clock signal CLK_RX has begun toggling. For instance, RX block 404-1 may determine when locally generated clock signal CLK_RX1 begins pulsing.

RX block 404 will look for a data boundary marker (e.g., a header marker such as that shown in FIG. 3, a footer marker, or other suitable forms of data boundary identification) for each of the data lanes in that link (step 506). The latency counter 408 within receiver block 404 starts incrementing as soon as the rising edge of CLK_RX is detected at step 502 and will continue to increment (step 508) until all of the data boundary markers for every data lane in that link has been received.

When the data marker has been detected in all lanes, RX block 404 may then assert its dev_aligned output (at step 510). Processing may loop back to step 502 (as shown by path 512) if there are other data links within the system that have yet to assert their dev_aligned output.

Once all of the RX blocks within receiver device 202 have asserted their dev_aligned output, combined signal Mdev_aligned will then be asserted (at step 514). Asserting signal Mdev_aligned will cause each of the counters 408 within the RX blocks 404 to stop incrementing, and the highest latency counter value (e.g., value X) will be stored into the worst-case latency CSR 422 at step 516.

At step 518, deterministic latency controller 420 may retrieve the link reinitialization latency compensation offset amount (e.g., value Y) from CSR 424 and may also retrieve the worst-case latency value X from CSR 422. Deterministic latency controller 420 may then sum together X and Y to compute the total deterministic system latency L*. Latency value L* may be used to determine when data stored in the elastic buffers 410 can be simultaneously released to the core logic circuitry (step 520).

Figure 6:
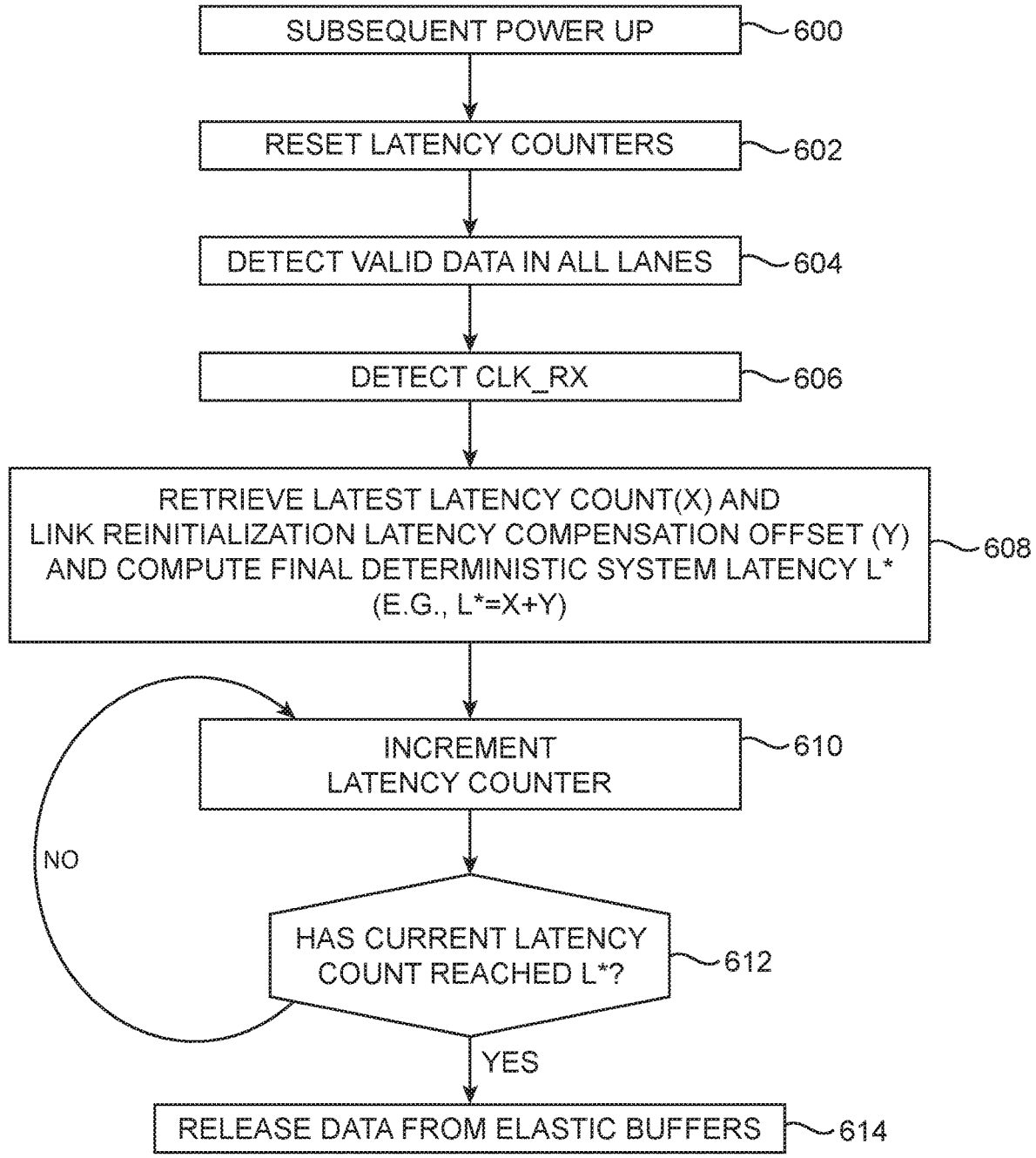
FIG. 6 is a flow chart of illustrative steps for operating a multi-link system of the type shown in FIG. 4 to achieve the deterministic latency target in accordance with an embodiment.

FIG. 6 is a flow chart of illustrative steps for operating a multi-link system after the worst-case deterministic latency has been acquired as shown in FIG. 5. At step 600, the receiver device 202 may experience a subsequent power cycle (i.e., the data links would be reinitialized). At step 602, all of the latency counters 408 may be reset to a count value of zero.

At step 604, valid data may begin arriving over the various data lanes in each of the multiple links. At step 606, the locally generated clock signals will begin to toggle at each of the RX blocks 404 at the same time or at slightly different times (e.g., the rising edge of the various signals CLK_RX may be detected).

At step 608, the deterministic latency controller 420 may retrieve the latest latency count value X from register 422 and the link reinitialization latency compensation offset value Y from register 424 and compute a corresponding sum that is equal to the final golden reference system latency L* that meets the deterministic latency target for the multilink system.

The latency counters within each of the RX blocks will start incrementing (at step 610) as soon as clock signal CLK_RX beings to toggle. Data arriving at the buffer circuits 410 in each of the RX blocks will be held until the output of the latency counters has reached L* (see step 612). When the latency count reaches or exceeds L*, data may then be released in parallel from all of the elastic buffers (at step 614).

This example illustrates how subsequent link reinitializations do not require the worst-case latency to be reacquired. Upon each subsequent power cycle, the deterministic latency counter can rely on the persistent values stored in CSRs 422 and 424 to calculate the final deterministic release latency L*. If desired, L* may be statically stored in a register so that controller 420 need not perform the sum operation of X and Y. If desired, the value of CSR 422 may be periodically recalibrated (e.g., using the steps of FIG. 5), and th value of CSR 424 may be updated as the device ages.

Although the methods of operations are described in a specific order, it should be understood that other operations may be performed in between described operations, described operations may be adjusted so that they occur at slightly different times or described operations may be distributed in a system which allows occurrence of the processing operations at various intervals associated with the processing, as long as the processing of the overlay operations are performed in a desired way.

System configurations described herein where deterministic latency controller 420 can be used to automatically obtain and provide a golden reference deterministic latency for a JESD204 interface is merely illustrative. In general, controller 420 may be used in any receiver device that receives information from a transmitter in accordance with any communications protocol that requires some deterministic latency target.

EXAMPLES

The following examples pertain to further embodiments.

Example 1 is an integrated circuit, comprising: a receiver block configured to receive data via a data link having a plurality of data lanes; and a deterministic latency controller configured to determine a worst-case latency value for the plurality of data lanes in the data link and configured to release the received data from the receiver block in accordance with a golden reference deterministic latency value computed based on the worst-case latency value.

Example 2 is the integrated circuit of example 1, wherein the deterministic latency controller optionally comprises a register configured to store the worst-case latency value.

Example 3 is the integrated circuit of example 2, wherein the deterministic latency controller optionally further comprises an additional register configured to store a link reinitialization latency compensation value that provides extra margin to compensate for potential latency variation when performing successive link reinitialization operations on the data link.

Example 4 is the integrated circuit of example 3, wherein the deterministic latency controller is optionally further configured to compute the golden reference deterministic latency value by summing the worst-case latency value and the link reinitialization latency compensation value.

Example 5 is the integrated circuit of any one of examples 1-4, wherein the receiver block optionally comprises: a local clock generator configured to generate a local clock signal; and a counter circuit configured to start counting in response to when the local clock signal begins toggling.

Example 6 is the integrated circuit of example 5, wherein the receiver block optionally further comprises: a buffer circuit configured to store the data received over the data link and configured to release the stored data only when the counter circuit outputs a value that is equal to or greater than the computed golden reference deterministic latency value.

Example 7 is the integrated circuit of any one of examples 1-6, wherein the receiver block is optionally further configured to assert an alignment signal upon receiving data in all of the plurality of data lanes in the data link.

Example 8 is the integrated circuit of example 7, optionally further comprising: an additional receiver block configured to receive data via an additional data link having a plurality of data lanes, wherein the additional received block is further configured to assert an additional alignment signal upon receiving data in all of the plurality of data lanes in the additional data link.

Example 9 is the integrated circuit of example 8, optionally further comprising: a logic gate configured to receive the alignment signal from the receiver block, to receive the additional alignment signal from the additional receiver block, and to generate a corresponding output signal that directs a first counter in the receiver block and a second counter in the additional receiver block to stop incrementing.

Example 10 is the integrated circuit of any one of examples 1-9, wherein the data link is optionally coupled to an external data converter, and wherein the data travelling over the data link from the external data converter must be transmitted in accordance with an interface standard that requires use of a deterministic latency.

Example 11 is a method of operating an integrated circuit, the method comprising: with a receiver block in the integrated circuit, receiving data via a plurality of data lanes in a data link; with the receiver block, buffering the data received at the receiver block; determining a worst-case latency for the plurality of data lanes; and releasing the data buffered at the receiver in accordance with a final deterministic latency computed based on the worst-case latency.

Example 12 is the method of example 11, optionally further comprising: with a clock generator in the integrated circuit, generating a local clock signal.

Example 13 is the method of example 12, optionally further comprising: in response to detecting a rising edge in the local clock signal, directing a counter in the receiver block to start counting.

Example 14 is the method of example 13, optionally further comprising: in response to receiving data in all of the plurality of data lanes, directing the counter in the receiver block to stop counting.

Example 15 is the method of example 14, optionally further comprising: storing the output of the counter in a configuration status register on the integrated circuit, wherein the output of the counter represents the worst-case latency.

Example 16 is the method of example 15, optionally further comprising: with a deterministic latency controller on the integrated circuit, combining the stored counter output with a predetermined offset amount to compute the final deterministic latency.

Example 17 is a system, comprising: a first transmitter configured to output first data signals; a second transmitter configured to output second data signals; and an integrated circuit that comprises: a first receiver block configured to receive the first data signals via a first data link; a second receiver block configured to receive the second data signals via a second data link; and a deterministic latency controller configured to determine a worst-case latency for the first and second data links.

Example 18 is the system of example 17, wherein the first receiver block is optionally further configured to output a first alignment signal, wherein the second receiver block is optionally further configured to output a second alignment signal, and wherein the integrated circuit optionally further comprises a logic gate configured to receive the first and second alignment signals and to output a corresponding control signal that is fed back to the first and second receiver blocks.

Example 19 is the system of example 18, wherein the logic gate optionally comprises a logic AND gate.

Example 20 is the system of any one of examples 17-19, wherein the deterministic latency controller optionally comprises: a first non-volatile storage component configured to store the worst-case latency; and a second non-volatile storage component configured to store a predetermined latency compensation value.

For instance, all optional features of the apparatus described above may also be implemented with respect to the method or process described herein. The foregoing is merely illustrative of the principles of this disclosure and various modifications can be made by those skilled in the art. The foregoing embodiments may be implemented individually or in any combination.

What is claimed is:

1. An integrated circuit, comprising:
   a receiver block configured to receive data via a data link having a plurality of data lanes, wherein the receiver block is further configured to buffer additional data received at the receiver block after a power cycle that causes reinitialization of the data link; and
   a deterministic latency controller configured to determine a worst-case latency value for the plurality of data lanes in the data link and configured to release the received data from the receiver block in accordance with a golden reference deterministic latency value, wherein the deterministic latency controller is further configured to compute the golden reference deterministic latency value by summing the worst-case latency value and a link reinitialization latency compensation value that provides extra margin to compensate for a worst-case latency variation when performing successive link reinitialization operations on the data link, wherein the receiver block releases the additional data buffered at the receiver block in response to a latency count reaching the golden reference deterministic latency value determined using stored values of the worst-case latency value and the link reinitialization latency compensation value without reacquiring the worst-case latency value for the plurality of data lanes after the power cycle.

2. The integrated circuit of claim 1, wherein the deterministic latency controller comprises a register configured to store the worst-case latency value.

3. The integrated circuit of claim 2, wherein the deterministic latency controller further comprises an additional register configured to store the link reinitialization latency compensation value.

4. The integrated circuit of claim 1, wherein the receiver block comprises a local clock generator configured to generate a local clock signal, a counter circuit configured to start counting in response to when the local clock signal begins toggling, and a buffer circuit configured to store the data received via the data link.

5. The integrated circuit of claim 4, wherein the buffer circuit is configured to release the stored data only when the counter circuit outputs a value that is equal to or greater than the computed golden reference deterministic latency value.

6. The integrated circuit of claim 4, wherein an output of the counter circuit is the latency count.

7. The integrated circuit of claim 1, wherein the receiver block is further configured to assert an alignment signal upon receiving data in all of the plurality of data lanes in the data link.

8. The integrated circuit of claim 7, further comprising:
   an additional receiver block configured to receive data via an additional data link having a plurality of data lanes, wherein the additional receiver block is further configured to assert an additional alignment signal upon receiving data in all of the plurality of data lanes in the additional data link.

9. The integrated circuit of claim 8, further comprising:
   a logic gate configured to receive the alignment signal from the receiver block, to receive the additional alignment signal from the additional receiver block, and to generate a corresponding output signal that directs a first counter in the receiver block and a second counter in the additional receiver block to stop incrementing.

10. The integrated circuit of claim 1, wherein the data link is coupled to an external data converter, and wherein the data travelling over the data link from the external data converter must be transmitted in accordance with an interface standard that requires use of a deterministic latency.

11. A method of operating an integrated circuit, the method comprising:
    with a receiver block in the integrated circuit, receiving data via a plurality of data lanes in a data link;
    with the receiver block, buffering the data received at the receiver block;
    determining a worst-case latency for the plurality of data lanes;
    with a deterministic latency controller in the integrated circuit, computing a final deterministic latency by combining the worst-case latency and a worst-case predetermined offset amount that provides extra margin to compensate for a worst-case latency variation when performing successive link reinitialization operations on the data link;
    with the receiver block, buffering additional data received at the receiver block after a power cycle of the receiver block that causes reinitialization of the data link; and
    releasing the additional data buffered at the receiver block after the power cycle when a latency count reaches the final deterministic latency determined using stored values of the worst-case latency and the worst-case predetermined offset amount without reacquiring the worst-case latency for the plurality of data lanes after the power cycle.

12. The method of claim 11, further comprising:
with a clock generator in the integrated circuit, generating a local clock signal.

13. The method of claim 12, further comprising:
in response to detecting a rising edge in the local clock signal, directing a counter in the receiver block to start counting.

14. The method of claim 13, further comprising:
in response to receiving data in all of the plurality of data lanes, directing the counter in the receiver block to stop counting.

15. The method of claim 14, further comprising:
storing the latency count of the counter in a configuration status register on the integrated circuit.

16. The method of claim 15, further comprising:
with the receiver block, asserting an alignment signal upon receiving data in all of the plurality of data lanes in the data link.

17. A system comprising an integrated circuit, wherein the integrated circuit comprises:
a deterministic latency controller configured to determine a worst-case latency for first and second data links, wherein the deterministic latency controller is further configured to compute a golden reference deterministic latency value by summing the worst-case latency for the first data link and a link reinitialization latency compensation value that provides extra margin to compensate for a worst-case latency variation when performing successive link reinitialization operations on the first data link; and
a first receiver block configured to receive first data signals via the first data link, the first receiver block having a first buffer configured to store the first data signals and to release the first data signals based on the golden reference deterministic latency value, wherein the first receiver block is further configured to output a first alignment signal upon receiving a data marker for every data lane in the first data link, wherein the first receiver block is further configured to store second data signals received at the first receiver block after a power cycle that causes reinitialization of the first data link, and wherein the first receiver block releases the second data signals after the power cycle in response to a latency count reaching the golden reference deterministic latency value determined using stored values of the worst-case latency and the link reinitialization latency compensation value without reacquiring the worst-case latency for the first data link after the power cycle.

18. The system of claim 17, wherein the integrated circuit further comprises:
a second receiver block configured to receive third data signals via the second data link, the second receiver block having a second buffer configured to store the third data signals and to release the third data signals when directed by the deterministic latency controller based on the worst-case latency, wherein the second receiver block is further configured to output a second alignment signal upon receiving a data marker for every data lane in the second data link; and
a logic gate configured to receive the first and second alignment signals and to output a control signal that directs a first counter in the first receiver block and a second counter in the second receiver block to stop incrementing.

19. The system of claim 18, wherein the logic gate comprises a logic AND gate.

20. The system of claim 17, wherein the deterministic latency controller comprises:
a first non-volatile storage component configured to store the worst-case latency; and
a second non-volatile storage component configured to store the link reinitialization latency compensation value.

* * * * *